United States Patent
Hansen et al.

(10) Patent No.: US 9,544,662 B2
(45) Date of Patent: Jan. 10, 2017

(54) DISTRIBUTING METADATA TO PEER DEVICES

(71) Applicant: MOTOROLA MOBILITY LLC, Chicago, IL (US)

(72) Inventors: Mark D. Hansen, Buffalo Grove, IL (US); Michael A. Calendine, Lawrenceville, GA (US); Grant H. Lloyd, Lawrenceville, GA (US); Matthew Richard Vokoun, Mountain View, CA (US); Cedric L. Welch, Huntley, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 281 days.

(21) Appl. No.: 14/338,407

(22) Filed: Jul. 23, 2014

(65) Prior Publication Data

US 2015/0188975 A1   Jul. 2, 2015

Related U.S. Application Data

(60) Provisional application No. 61/921,606, filed on Dec. 30, 2013.

(51) Int. Cl.
| | |
|---|---|
| *G06F 15/16* | (2006.01) |
| *H04N 21/84* | (2011.01) |
| *H04L 29/06* | (2006.01) |
| *H04N 21/41* | (2011.01) |
| *H04N 21/81* | (2011.01) |
| *H04L 29/08* | (2006.01) |

(52) U.S. Cl.
CPC ............ *H04N 21/84* (2013.01); *H04L 65/607* (2013.01); *H04L 67/1068* (2013.01); *H04N 21/4108* (2013.01); *H04N 21/8113* (2013.01)

(58) Field of Classification Search
USPC .................................................. 709/231, 204
See application file for complete search history.

(56) References Cited

U.S. PATENT DOCUMENTS

| 7,844,224 B2 | 11/2010 | Tian et al. |
| 7,945,624 B2 | 5/2011 | Guccione |

(Continued)

FOREIGN PATENT DOCUMENTS

| EP | 1457965 A2 | 9/2004 |
| EP | 2409273 A1 | 1/2012 |
| WO | 2011043886 A1 | 4/2011 |

OTHER PUBLICATIONS

App Factory Inc., JukeboxHero—The Social Jukebox & Remote Control Music Player, http://evolver.fm/appdb/app/jukeboxhero-social-jukebox-remote-control-music-pl/, downloaded from internet: Jul. 22, 2014, all pages.

(Continued)

*Primary Examiner* — Philip B Tran

(74) *Attorney, Agent, or Firm* — Shumaker & Sieffert, P.A.

(57) ABSTRACT

This document describes techniques (300, 600, 700) and apparatuses (106, 800) for distributing metadata to peer devices. These techniques (300, 600, 700) and apparatuses (106, 800) enable a receiver device (106) store or create metadata associated with content streamed from one or more peer devices. The receiver device can distribute this metadata to other peer devices thereby enabling identification or procurement of the content at the other peer devices.

20 Claims, 8 Drawing Sheets

(56) References Cited

U.S. PATENT DOCUMENTS

| | | | |
|---|---|---|---|
| 8,295,766 B2 | 10/2012 | Zimbric et al. | |
| 2007/0299737 A1* | 12/2007 | Plastina | G06Q 30/0207 |
| | | | 705/14.1 |
| 2007/0299778 A1* | 12/2007 | Haveson | H04L 63/107 |
| | | | 705/51 |
| 2008/0091717 A1 | 4/2008 | Garbow et al. | |
| 2009/0063419 A1* | 3/2009 | Nurminen | G06F 17/30817 |
| | | | 707/999.003 |
| 2009/0083117 A1* | 3/2009 | Svendsen | G06F 17/30209 |
| | | | 709/205 |
| 2010/0228740 A1 | 9/2010 | Cannistraro et al. | |
| 2011/0164535 A1 | 7/2011 | Gillipalli et al. | |
| 2012/0226769 A1* | 9/2012 | Basso | H04N 21/2408 |
| | | | 709/217 |
| 2014/0359151 A1 | 12/2014 | Hansen et al. | |

OTHER PUBLICATIONS

"Simultaneous Use of HFP, A2DP, and AVRCP Profiles," Nov. 18, 2008, Retrieved from https://www.bluetooth.org/docman/handlers/DownloadDoc.ashx?doc id=49216, 46 pgs.

Wikipedia, "List of Bluetooth Profiles," Jun. 1, 2013, Retrieved from http://en.wikipedia.org/w/index.php?title=List_of_Bluetooth_profiles&oldid=557845648, 14 pgs.

* cited by examiner

Data Structure 500

| | Time 502 | Song 504 | User 404 | MAC 206 | Device Name 208 | Title 506 | Artist 508 | Album 510 | Track 512 | Genre 514 | Duration 516 | Pre-Empted 518 |
|---|---|---|---|---|---|---|---|---|---|---|---|---|
| 520 | 8:00 PM | 1 | User A | 2D:AE | Mx:AE Phone | Chicago | Sufjan Stevens | Illinoise | 9 | Indie | 6:05 | No |
| 522 | 8:06 PM | 2 | User E | 4A:E7 | Lisa's Phone | Why Can't This Be Love | Van Halen | 5150 | 2 | | 3:48 | No |
| 524 | 8:09 PM | 3 | User E | 4A:E7 | Lisa's Phone | Hysteria | Def Leppard | Mirrorball (Live) | 4 of 14 | Rock | 5:55 | No |
| 526 | 8:14 PM | 4 | User B | CF:2F | Mx 87 Tablet | The Chain | Fleetwood Mac | Rumours | 7 of 11 | Classic Rock | 4:31 | Yes |
| 528 | 8:16 PM | 5 | User C | 44:FD | Michael's Phone | | | | | | | Yes |
| 530 | 8:17 PM | 6 | User D | 21:CC | <Not Available> | I Want You To Want Me | Cheap Trick | Live at Budokan | 1 of 16 | Rock | 3:44 | Yes |
| 532 | 8:19 PM | 7 | User A | 2D:AE | Mx:AE Phone | Barracuda | Heart | Greatest Hits | | | 4:22 | No |

DISTRIBUTING METADATA TO PEER DEVICES

BACKGROUND

This background description is provided for the purpose of generally presenting the context of the disclosure. Unless otherwise indicated herein, material described in this section is neither expressly nor impliedly admitted to be prior art to the present disclosure or the appended claims.

Computing devices are often connected to a dedicated audio device to present content to multiple listeners or to increase an area over which the content is presented. Dedicated audio devices typically present the content of a source computing device in an analog format, which is broadcast aurally to the multiple listeners. While this is effective to present the content to the multiple listeners, the analog format often lacks other information describing the content. In cases where a listener wishes to determine the information describing the content (e.g., artist or song name), the listener may be prevented from doing so without direct access to the source computing device. Even when the source computing device is accessible, manually exporting the information associated with the content may be inconvenient or time consuming.

BRIEF DESCRIPTION OF THE DRAWINGS

Techniques and apparatuses for distributing metadata to peer devices are described with reference to the following drawings. The same numbers are used throughout the drawings to reference like features and components.

FIG. 5 illustrates an example data structure for storing metadata and information associated with presenting streamed content.

DETAILED DESCRIPTION

Some audio devices can present content streamed from a computing device via a wireless network connection. The audio devices, however, typically present the content in an analog format that lacks information identifying the content, such as metadata associated with each portion or file of the content. Without this information, listeners of the content are often forced to manually determine the information identifying the content by accessing the computing device from which the content is streamed or other sources of content information. Additionally, determining information associated with previously presented content may not be possible once presentation of the content concludes, particularly if a source device of the content is not accessible.

This disclosure describes techniques and apparatuses for distributing metadata to peer devices, which enable a content-receiver device (e.g., audio device) to store metadata received from one or more content-streaming peer devices. The content-receiver device can then distribute the stored metadata and other information to other peer devices. The other peer devices can identify, based on the metadata, the content being presented, or previously presented, by the content-receiver device. By so doing, users of the respective peer devices can identify or procure the content presented by the content-receiver device without accessing the peer device from which the content is streamed or other sources of information.

The following discussion first describes an operating environment, followed by techniques that may be employed in this environment, and ends with example apparatuses.

Operating Environment

Figure 1:
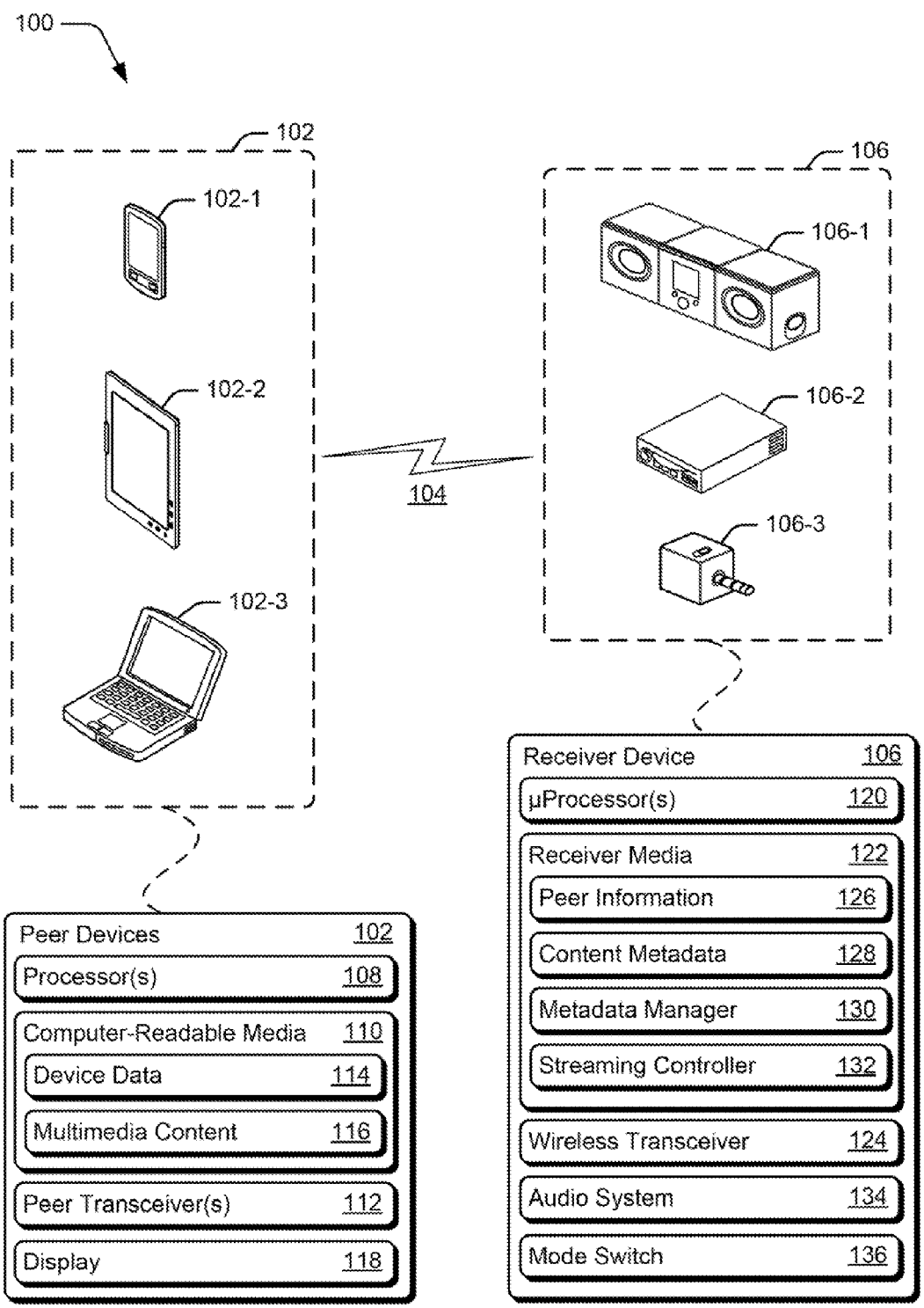
FIG. 1 illustrates an example environment in which techniques of distributing metadata to peer devices can be implemented.

FIG. 1 illustrates an example environment 100 in which techniques for distributing metadata to peer devices can be implemented. The example environment 100 includes peer devices 102, wireless communication medium 104, and content-receiver device 106 (receiver device 106). Receiver device 106 can communicate directly and concurrently with each peer device 102, from which separate streams of content are received. Peer devices 102 can be, or include, many different types of computing or electronic devices capable of streaming audio or video content. Three example peer devices are shown, though others are contemplated. These example peer devices include smart phone 102-1, tablet computer 102-2 (tablet 102-2), and laptop computer 102-3 (laptop 102-3). Other peer devices may include, by way of example only, a cellular phone, notebook computer (e.g., netbook or ultrabook), personal media player, gaming console, desktop computer, video camera, or web-enabled content streaming device (e.g., set-top box).

Each peer device 102 includes a processor(s) 108, computer-readable media 110, and peer device wireless transceiver(s) 112 (peer transceiver(s) 112). Computer-readable media 110 (CRM 110) includes device data 114 and multimedia content 116, which may include any suitable video data, image data, audio data, or other multimedia data. A peer device 102 may receive audio data from a content server, such as a cloud-based music store, another computing device, or an online music streaming service. The received audio data is stored or cached by the peer device 102 as audio data within multimedia content 116.

The audio data of multimedia content 116 may be encoded in accordance with any suitable codec or format, such as MPEG-2 Audio Layer III (MP3), MPEG-4 Audio, Windows media audio (WMA), advanced audio coding (AAC), high efficiency AAC (HE-ACC), Ogg Vorbis, and the like. Each type of encoding or format may enable inclusion of information describing properties of the audio data, such as metadata that describes an artist, title, album, track number, genre, or duration of a file or portion of audio data. In some cases, this information is stored in a container or tag within in a file of the audio data (e.g., an ID3 container of an MP3 file). A peer device 102 may store the audio data in a format in which the audio data is received or convert the audio data to a different format prior to storage or caching. Once the audio data is stored or cached in multimedia content 116, peer device 102 can playback or stream the audio data as described below.

Alternately or additionally, a peer device 102 may employ a same or other codec when streaming the audio data from multimedia content 116, such as sub-band coding (SBC), MP3, AAC, HE-AAC, or AptX™ coding. Audio data encoded using these codecs or formats may also include information describing properties of the audio data, such as metadata that describes content of the audio data. This metadata may be stored in a file tag or container as defined by each of the respective formats. In some cases, these other codecs or formats are supported by, or associated with, a particular wireless protocol, such as Bluetooth™.

Device data 114 includes other data of peer device 102, such as firmware, operating system, applications, programs, or non-multimedia user data. Peer transceiver(s) 112 may include any suitable type of wireless transceiver that enables peer device 102 to communicate via wireless communication medium 104. For example, a peer transceiver 112 that is configured as a Bluetooth™ transceiver communicates over wireless medium 104 via a Bluetooth™ pico-net.

Alternately or additionally, peer device 102 may include other types of wireless transceivers, such as a near field communication (NFC) module, wireless local-area-network (WLAN) transceiver, or cellular radio. Although not shown, peer device 102 may also communicate via a wired communication interface, such as an Ethernet transceiver or universal serial bus (USB) port. In some cases, peer device 102 includes a display 118 that enables user interaction with content-related applications or graphical user-interfaces of peer device 102. In such cases, the display may be associated with, or include, a touch sensitive input device (e.g., touchscreen) through which user input is received.

Content-receiver device 106 (receiver device 106) can be one of many different types of devices capable of communicating with, and receiving content from, peer devices 102. Three example receiver devices are shown, though others are contemplated. These example receiver devices include portable audio system 106-1 (e.g., portable stereo), automotive audio receiver 106-2 (automotive receiver 106-2), and auxiliary audio input device 106-3 (e.g., 3.5 mm audio dongle).

Each receiver device 106 includes micro-processor(s) 120 (μprocessor(s) 120), receiver device computer-readable media 122 (receiver media 122), and a wireless transceiver 124. Receiver media 122 includes peer device information 126 (peer information 126), content metadata 128, metadata manager 130, and streaming controller 132. Peer information 126 includes data associated with one or more peer devices 102 and/or data useful to communicate therewith. Content metadata includes information associated with content received from one or more respective peer devices 102. Metadata manager 130 is configured to manage peer information 126 and content metadata 128. How metadata manager is implemented and used varies and is described below.

Streaming controller 132 is configured to enable a receiver device 106 to manage streams of content received from one or more peer devices 102. In some cases, stream controller 132 enables a receiver device 106 to establish and/or maintain multiple wireless connections with multiple respective peer devices 102. By so doing, receiver device 106 can present content streamed from multiple respective peer devices 102 without having to manually reconfigure or re-establish wireless connections.

Wireless transceiver 124 may include any suitable type of wireless transceiver that enables receiver device 106 to communicate via wireless communication medium 104. For example, wireless transceiver 124 may include a WLAN transceiver or a short-range wireless radio, such as a Bluetooth™ radio. In some cases, receiver device 106 may include multiple wireless transceivers or a wired transceiver interface, such as a USB port or an Ethernet interface that communicates via an internet-protocol (IP).

Each receiver device 106 may also include audio system 134 and mode switch 136. Audio system 134 enables receiver device 106 to present (e.g., playback) audio content received from one or more peer devices 102. Audio system 134 may include circuitry or components configured to perform digital-to-analog conversion, amplification, equalization, play control, and/or filtering of audio signals. Audio signals provided by audio system 134 are transmitted to one or more speakers, which may be integrated with, or separate from, receiver device 106. For example, automotive receiver 106-2 may be integrated with an audio system of a vehicle, enabling streamed audio content to be presented to occupants of the vehicle via on-board speakers.

Alternately or additionally, receiver device 106 may include a video system (not shown) for processing a stream of video content. In some cases, the video system includes a display integrated with receiver device 106, such as a liquid crystal display (LCD) or touch-sensitive GUI control panel. Mode switch 136 enables a user to select a content streaming mode of receiver device 106. For example, a user may select, via mode switch 136, a content streaming mode in which content is continuously streamed from a currently connected peer device 102. Alternately, a user may select, via mode switch 136, a content streaming mode in which content is collaboratively streamed from among multiple peer devices 102. Alternately or additionally, functionalities provided by mode switch 136 may be implemented by an application executing on a peer device 102, with configurations or commands communicated via a wireless connection (e.g., wireless communication medium 104).

Wireless communication medium 104 (wireless medium 104) provides a wireless medium by which peer devices 102 and receiver device 106 may communicate. For example, peer transceiver 112 and wireless transceiver 124 can communicate data via a connection of a wireless network implemented through wireless medium 104. Example wireless networks include a wireless wide-area networks (WWAN), wireless local-area network (WLAN) and wireless personal-area network (wireless PAN), each of which may be configured, in part or entirely, as infrastructure, ad-hoc, or mesh networks. Alternately or additionally, peer device 102 may communicate with peer devices 102 via a wired communication network (not shown), such as an Ethernet or other IP based network.

Figure 2:
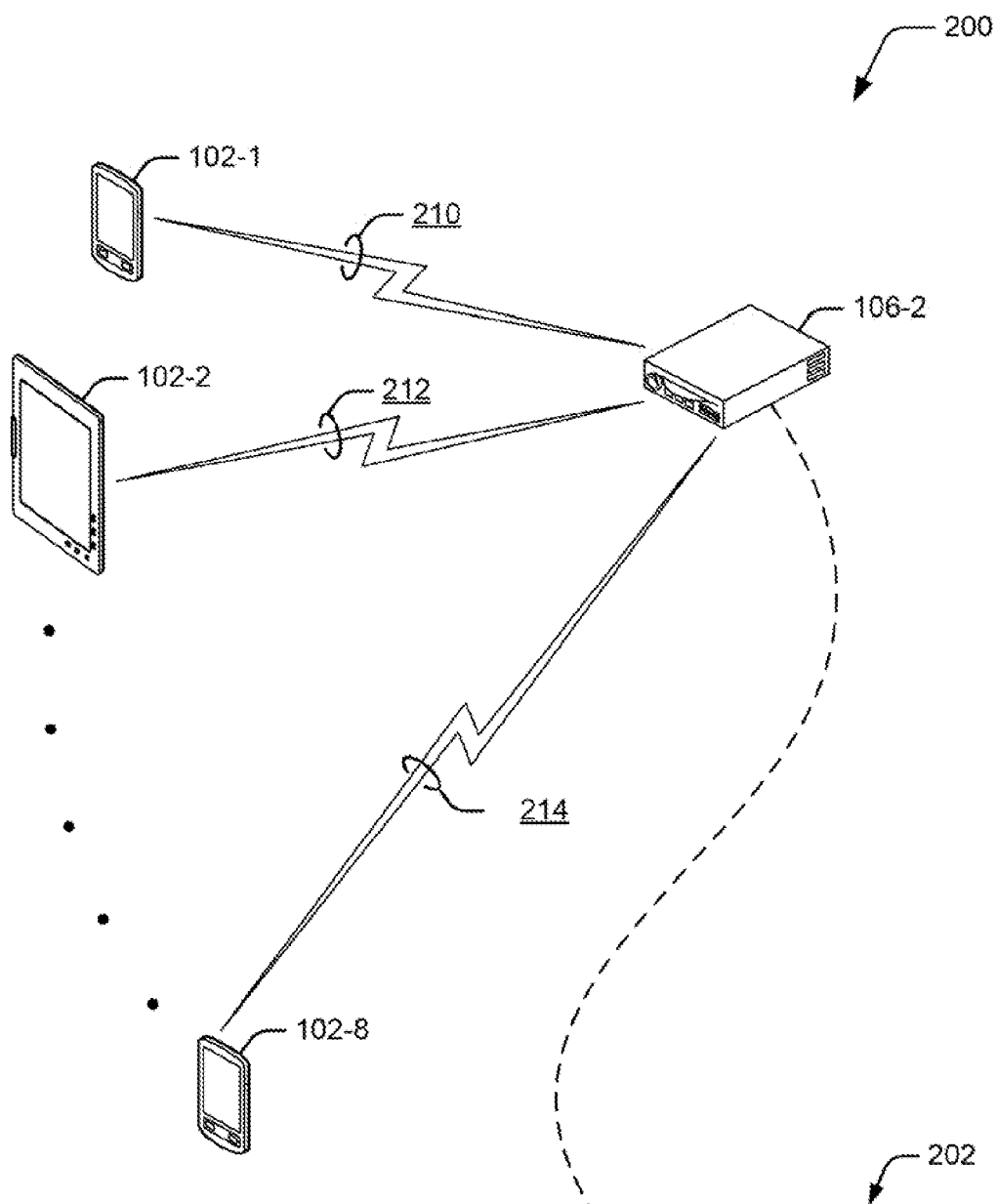
FIG. 2 illustrates a wireless network implemented in accordance with one or more aspects of distributing metadata to peer devices.

FIG. 2 illustrates an example wireless network 200 implemented in accordance with one or more aspects of distributing metadata to peer devices. In this particular example, automotive receiver 106-2 communicates with multiple peer devices 102, three of which are shown for visual brevity. These peer devices include smart phone 102-1, tablet 102-2, and another smart phone 102-8 (peer devices 102-3 through 102-7 not shown). Here, automotive receiver 106-2 is configured to communicate over a wireless personal-area-network (PAN) in accordance with a Bluetooth™ protocol. The Bluetooth™ family of protocols support various communication profiles for communicating various types of data and/or enabling different feature sets between devices associated via a wireless PAN.

Communication profiles for audio or video distribution, such as the generic audio/video distribution profile (GAVDP) enable a device to communicate multimedia data with other devices. For example, peer device 102 can stream audio content to receiver device 106 via the advanced audio distribution profile (A2DP). Alternately or additionally, peer device 102 can stream video content to receiver device 106 via the video distribution profile (VDP). Other suitable profiles or communication protocols may also be used to stream content from a peer device to a receiver device. For example, metadata can also be communicated using a serial port profile or other profiles of the Bluetooth™ family of protocols.

Peer device 102 can control aspects of content-presentation, such as volume or play control (e.g., play, stop, fast-forward, rewind, track advance), at receiver device 106 using the audio/video remote control profile (AVRCP). Alternately or additionally, metadata associated with streaming content is transmitted to receiver device 106 via AVRCP connection for use or storage at receiver device 106. The metadata associated with the content may include information that describes an artist, title, album, track number (and/or number of total tracks), genre, or duration of the content. For example, a display-enabled receiver device 106 can display information or images associated with an artist, album, or track of content being presented.

The metadata can also be stored to a local metadata memory or metadata repository of receiver device 106. The stored metadata is useful to create playlists of content that receiver device 106 presents. For example, as receiver device 106 presents content from one or more peer devices 102, metadata associated with each portion (e.g., track or song) of content can be stored in a metadata repository. The stored metadata is then leveraged to create a playlist for distribution to the one or more peer devices. Alternately or additionally, metadata of currently-presented content can be transmitted to other peer devices, enabling the currently-presented content to be identified at the other peer devices.

To create wireless network 200, receiver device 106 associates or "pairs" with peer devices 102 to establish a wireless link with each of peer device 102. Each wireless link may include one or more connections that are implemented via different respective communication profiles or protocols. For example, receiver device 106 may receive, from peer device 102, content via an A2DP profile connection and metadata via an AVRCP profile connection.

When devices pair, the devices exchange self-identifying information that is useful to configure wireless links or connections between the devices. In some cases, self-identifying information is exchanged manually by entering personal identification numbers (PINs) at one, or both of, the devices. In other cases, exchanging self-identifying information can be automatic, automated, or proximity based. For example, receiver device 106 may include a near-field communication (NFC) module or radio-frequency identification (RFID) tag that enables peer device 102 to automatically pair with receiver device 106 when proximate (e.g., within 0.5 meters).

In the context of the present example, automotive receiver 106-2 pairs with smart phone 102-1 to establish wireless link 210. Automotive receiver 106-2, or a wireless connection manager thereof (not shown), then stores self-identifying information associated with smart phone 102-1 in peer device information table 202 (e.g., a pairing table). Peer information table 202 stores identification information associated with peer devices 102, such as a play priority 204, medium access control (MAC) addresses 206, or device names 208. When a peer device 102 lacks device name information or is named with a duplicate device name, the peer device 102 may be identified using MAC address 206, which is a unique 48-bit address assigned to peer transceiver 112 of each peer device 102. Although shown as stored in a table, peer device information may be stored in any suitable data format or local data repository, such as an array, index, map, list, and the like.

As shown in FIG. 2, peer information table 202 can store information associated with up to eight unique peer devices 102. Additional memory, however, can be allocated to peer information table 202 increasing a number of peer devices 102 for which information can be stored. Peer device information may be added to, or persist within, peer information table 202 until the table becomes full. Once full, an oldest entry of peer information table 202 is discarded to create space for peer device information associated with a new peer device.

When a peer device 102 associates or pairs with receiver device 106, the peer device 102 creates a wireless link with receiver device 106. In the context of the current example, smart phone 102-1 creates wireless link 210, which includes an A2DP connection with automotive receiver 106-2. Generally, each wireless link between a peer device 102 and receiver device 106 may include one or more connections created using various profiles or protocols. These connections may be active or suspended, such as when not being used for streaming content or communicating metadata. Here, automotive receiver 106-2 may also create additional connections of wireless link 210 using other profiles, such as an AVRCP connection or serial port connection. Once each connection is created, receiver device 106 may suspend the connection to establish and/or maintain other connections with other peer devices 102.

For example, prior to establishing the A2DP connection with smart phone 102-1, streaming controller 132 of automotive receiver 106-2 may establish suspended A2DP connections with tablet 102-2 and smart phone 102-8, which are illustrated generally as wireless links 212 and 214, respectively. To do so, streaming controller 132 pairs with smart phone 102-8 to establish an A2DP connection, which is subsequently suspended prior to pairing with another peer device. Other peer devices in range, such as table 102-2, can then establish other A2DP connections with automotive receiver 106-2. Each of these other A2DP connections can then be suspended by stream controller 132. By so doing, automotive receiver 106-2 can stream audio content from smart phone 102-1 while maintaining connections with other peer devices 102.

While receiving the stream of audio content, automotive receiver 106-2 receives metadata from smart phone 102-1 via an AVRCP connection. This metadata, and metadata received from other peer devices, can be stored by metadata manager 130 as content metadata 128 in receiver media 122. Metadata manager 130 can then distribute the content metadata 128 to other peer devices 102, enabling the other peer devices 102 to identify the audio content streamed by smart phone 102-1. Additional or alternate aspects of distributing metadata to peer devices vary and are described below.

Example Techniques

The following discussion describes techniques for distributing metadata to peer devices, which enable a receiver device to store metadata received from a content streaming peer device and transmit the stored metadata to other peer devices. By so doing, the other peer devices may identify the content streamed to, and presented by, the receiver device. These techniques can be implemented utilizing the previously described environment, such as the peer information 126, content metadata 128, and/or metadata manager 130 of FIG. 1. These techniques include example methods illustrated in FIGS. 3, 6, and 7, which are shown as operations performed by one or more entities. The orders in which operations of these methods are described are not intended to be construed as a limitation, and any number or combination of the described method operations can be combined in any order to implement a method, or an alternate method, including any of those illustrated by FIGS. 3, 6, and 7.

Figure 3:
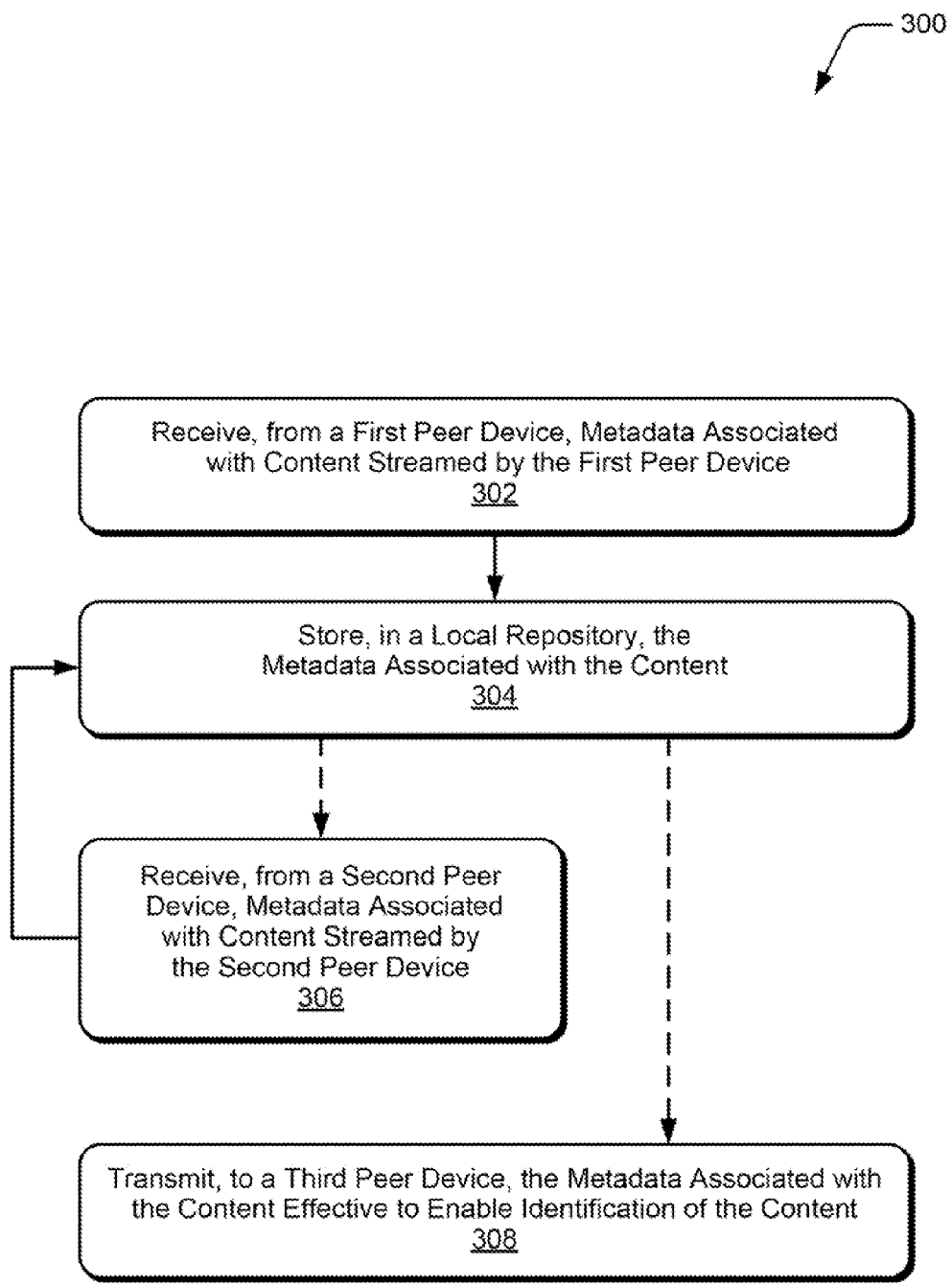
FIG. 3 illustrates an example method for distributing metadata to peer devices performed at least in part by a content-receiver device.

FIG. 3 illustrates example method(s) 300 for distributing metadata to peer devices performed at least in part by a content-receiver device.

At 302, metadata is received from a first peer device. The metadata is associated with content streamed by the first peer device for presentation. The metadata and content are received via a wireless network, such as a wireless personal-area-network or Bluetooth™ pico-net. In some cases, the metadata is received via a first connection of the wireless network and the content is received via a second connection of the wireless network. In such cases, the metadata can be received via an AVRCP connection and the content can be received via an A2DP connection. The metadata comprises information describing the content streamed, such as an artist, author, title, album, length, genre, format, cover art, copyrights, and the like.

Consider an example in which content is streamed from a peer device to receiver device for presentation. In the context of example wireless network 200, automotive receiver 106-2 plays a stream of audio data received from smart phone 102-1 via an A2DP connection, which is part of wireless link 210 (e.g., a Bluetooth pairing). Assume here that automotive receiver 106-2 has established suspended A2DP connections with other peer devices, such as a tablet 102-2 and a smart phone 102-8.

Figure 4:
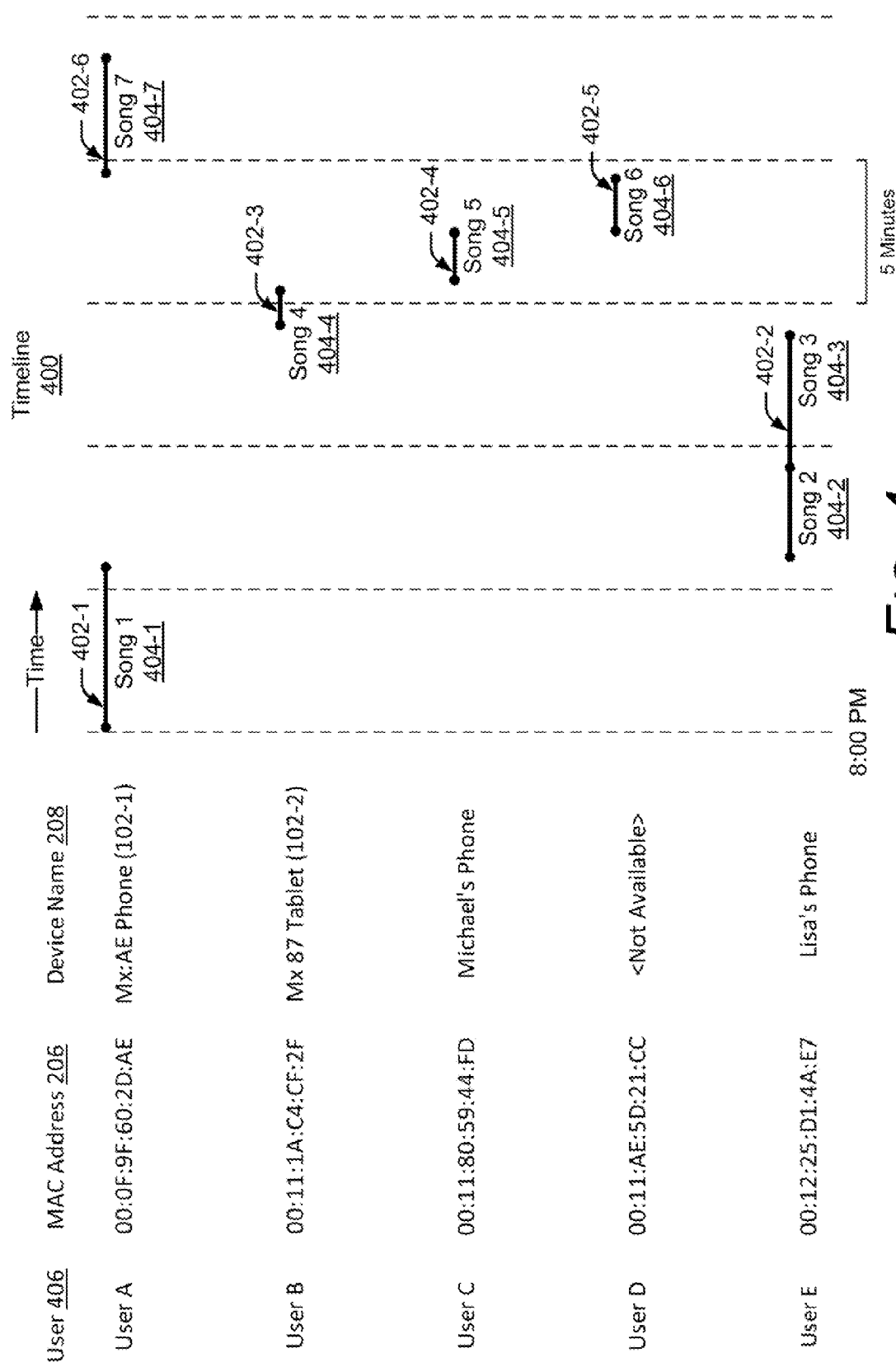
FIG. 4 illustrates an example timeline of presenting content streamed from multiple peer devices.

The stream of audio content received from smart phone 102-1 is played via speakers of a vehicle with which automotive receiver 106-2 is associated. FIG. 4 illustrates an example timeline 400 of presenting streams of audio content, including audio content received from smart phone 102-1. The audio content received from smart phone 102-1 is shown as content stream 402-1, which includes one song, song 1 404-1. Here, metadata manager associates content stream 402-1 with smart phone 102-1 by MAC address 206, device name 208, and/or by user 406. Although shown as generic alpha-type designations, actual user names can be associated with each peer device 102, such as by receiving respective user information from the peer device, an external data source, or by manual entry at receiver device 106.

While the stream of audio content is received, automotive receiver 106-2 receives metadata from smart phone 102-1 via an AVRCP connection. The AVRCP connection also enables User A to control volume or playback of content stream 402-1 via smart phone 102-1. The metadata received from smart phone 102-1 includes information associated with song 1 404-1, such as an artist, album, genre, track number, and the like.

At 304, the metadata associated with the content is stored in a local repository. The local repository may include any suitable type of data structure, such as an array, database, list, table, and the like. The metadata can also be stored with peer device information and information associated with presentation of the content. The peer device information may be retrieved from another data structure, such as another repository storing peer device information (e.g., paring table). The repository storing metadata and the repository storing peer device information may be separate, combined, or linked in any suitable fashion.

In some cases, supplemental metadata is obtained from an external source to complete partial metadata associated with the content. In such cases, incorrect metadata may also be corrected using the supplemental metadata received from the external source. Alternately or additionally, the metadata is presented via a display of a receiver device enabling listeners to review, edit, or otherwise manipulate the stored metadata.

In the context of the present example, metadata manager 130 stores the metadata received from smart phone 102-1 into receiver media 122 as content metadata 128. Metadata manager 130 also associates the metadata associated with song 1 404-1 with peer device information identifying smart phone 102-1. FIG. 5 illustrates an example data structure 500 in which the metadata is stored along with peer device information and information associated with presentation of the streamed content. Here, assume metadata manager 130 retrieves the peer device information from peer information table 202, which is implemented separate from data structure 500 in this example.

Categories of data structure 500 include a time when the song is played (time 502), an order in which the songs are played (song 504), title 506, song artist 508, album 510, track 512, genre 514, and duration 516 of presentation. Data structure 500 also includes an indication (pre-empted 518) of whether presentation or streaming of a song is pre-empted by presentation of other content or another peer device. Here, metadata manager 130 stores the metadata associated with song 1 404-1 in row 520 of data structure 500 with peer device information for smart phone 102-1 and information associated with the presentation of song 1 404-1.

From operation 304, method 300 may proceed to operation 306 or proceed to operation 308. At 306, metadata is received from a second peer device. The metadata is associated with content streamed by the second peer device for presentation. Receiving the stream of content from the second peer device may be responsive to the second peer device pre-empting the stream of content of the first peer device. In such cases, the second peer device can pre-empt the first peer device by activating a suspended A2DP connection of a Bluetooth™ pico-net. This can be effective to cause a receiver device to suspend the A2DP connection with the first peer device and initiate presentation of the content streamed from the second peer device.

The metadata associated with the content of the second peer device is received via another connection of the wireless network, such as an AVRCP connection. This metadata comprises information describing the content streamed from the second peer device. From operation 306, method 300 returns to operation 304 to store the metadata received from the second peer device. As different peer devices initiate streams of content, operations 304 and 306 may be repeated any suitable number of times. This can be effective to build playlists or databases of content presented by a receiver device.

Continuing the ongoing example and in the context of FIGS. 2 and 4, user E initiates playback of audio content on another phone (Lisa's phone), which activates a suspended A2DP connection. The stream controller 132 of automotive receiver 106-2 then suspends the A2DP connection with smart phone 102-1 and initiates presentation of a stream of audio content from the other phone.

The audio content received from the other phone is shown as content stream 402-2, which includes two songs, song 2 404-2 and song 3 404-3. Here, metadata manager associates content stream 402-2 with the other phone by MAC address 206, device name 208, and by user 406. While the stream of audio content is received, automotive receiver 106-2 receives metadata from the other phone via another AVRCP connection. Here, the AVRCP connection also enables user E to control volume or playback of content stream 402-2 via the other phone. The metadata received from the other phone includes information associated with song 2 404-2 and song 3 404-3, which is stored by metadata manager 130 in rows 522 and 524 of data structure 500.

For the sake of brevity and in the context of FIG. 4, assume that user B, user C, user D, and user A initiate subsequent streams of content as shown by example timeline 400. These subsequent streams include content streams 402-3 through 402-6, which include songs 404-4 through 404-7, respectively. For each song presented by automotive receiver 106-2, metadata manager 130 stores peer device information, metadata, and information associated with the presentation of the song. Metadata manager 130 stores the metadata and other information in rows 526 through 532 of data structure 500. As shown in FIG. 5, storing the metadata and other information in data structure 500 is effective to create a playlist of content presented by automotive receiver 106-2 and other useful information.

At 308, the metadata associated with the content presented is transmitted to a third peer device. This is effective to enable the third peer device to identify content streamed to the receiver device from the first peer device or the second peer device. In some cases, transmitting the metadata is responsive to receiving a request from the third peer device. Alternately or additionally, information identifying the peer device from which the content is received or information associated with presentation of the content is transmitted to the third peer device. The metadata or request are transmitted using any suitable medium, such as a wired or wireless network. By way of example, the request and metadata can be communicated using a serial port profile of a wireless PAN or an IP-based communication network, such as a WLAN or Ethernet connection.

The transmitted metadata may include metadata associated with content currently being presented or streamed. The transmitted metadata may also include a playlist or history of previously presented content. In some cases, the metadata transmitted to the third peer device may include metadata previously received from the third peer device during a content streaming session. The metadata may be transmitted to any suitable number of peer devices, including the first peer device or the second peer device.

Concluding the present example, assume that user B wishes to determine which songs have been presented by automotive receiver 106-2. User B initiates transmission of a request from tablet 102-2 to automotive receiver 106-2 via a serial port connection of wireless link 212. In response to receiving this request, metadata manager 130 transmits metadata, peer device information, and presentation information of data structure 500 to tablet 102-2. This enables tablet 102-2 to present a playlist of content to user B, who can review, filter, or purchase content described by the playlist.

Figure 6:
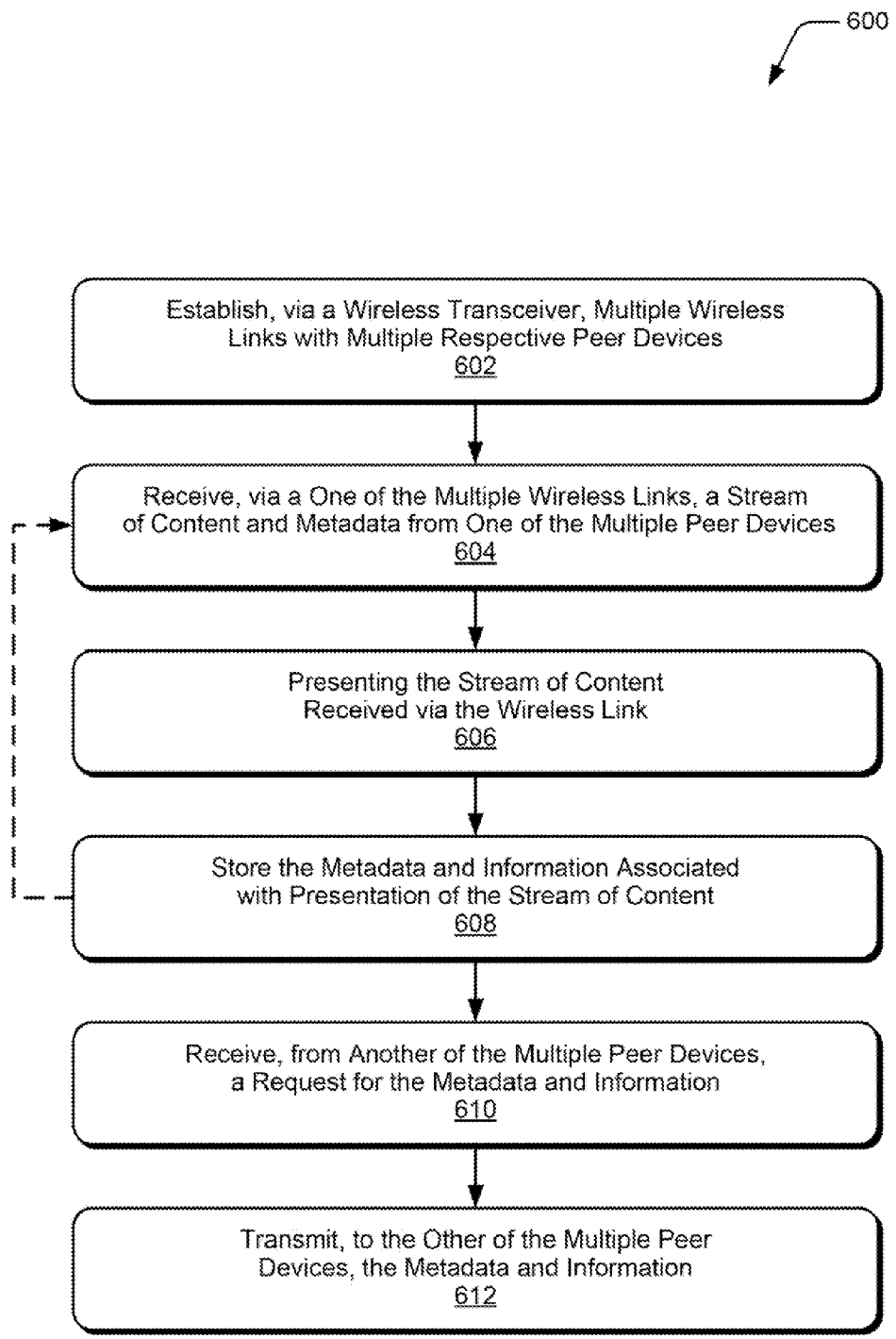
FIG. 6 illustrates an example method for distributing metadata to peer devices to multiple peer devices.

FIG. 6 illustrates an example method for distributing metadata to peer devices to multiple peer devices.

At 602, multiple wireless links with multiple respective peer devices are established via a wireless transceiver. The wireless transceiver is associated with a receiver device capable of presenting content or causing content to be presented. Each wireless link may include one or more wireless connections implemented by different communication protocols or profiles. For example, a wireless link with a peer device may include an A2DP connection, an AVRCP connection, or a serial port profile connection. A receiver device may also store information associated with each of the peer devices, such as by writing the information to a source information table. This information is useful to establish or maintain wireless links or connections with the multiple peer devices.

At 604, a stream of content is received from one of the peer devices via one of the respective wireless links. Metadata describing various aspects or properties of the stream of content is also received via the wireless link. The stream of content and metadata may be received over separate connections implemented using different communication profiles, such as an A2DP profile and an AVRCP profile. In some cases, the peer device is selected for content streaming responsive to the peer device activating a wireless connection over which the content is streamed. The content may include multiple portions or files of content, which may be encoded using any suitable codec. The metadata associated with the content may include descriptive information for each portion or file of content streamed from the peer device.

At 608, the stream of content received via the wireless link is presented by the receiver device. The stream of content is presented through any suitable content-presentation interface, such as a monitor, display, local speakers, stereo system, and/or remote speakers. In some cases, the receiver device plays audio content via internal or integrated speakers. In other cases, a receiver device causes the presentation of audio content by providing audio signals to an external audio system configured to play audio content. The audio signals may be transmitted to the external audio system via a wired or wireless interface (e.g., frequency modulation (FM) modulator). Alternately or additionally, the metadata describing the content may also be presented via a display of the receiver device.

At 608, metadata and information associated with presentation of the content is stored locally. The metadata and information associated with presentation of the content may be stored in any suitable type of data structure, such as an array, database, list, table, and the like. The metadata can also be stored with peer device information that identifies a peer device from which the content is streamed. In some cases, supplemental metadata is obtained from an external source to complete partial metadata. For example, if metadata lacks information associated with an album and track numbers of a song, an external source of information can be accessed to obtain and populate this missing information.

From operation 608 method 600 may return to operation 604 or proceed to operation 610. Returning to operation 604, content and metadata may be received from a different peer device. In some cases this is responsive to the different peer device activating a wireless connection to initiate a different stream of content. By repeating operations 604, 606, and/or 608, method 600 can build a playlist or database of content received from multiple peer devices for presentation, such as data structure 500 as described above.

By way of example, a receiver device may store metadata from a power-on event until presentation of a current stream of content. Alternately or additionally, the receiver device may store metadata associated with each streaming session, which can by initiated or terminated using mode switch 136. On completion of a streaming session, the receiver device can maintain the metadata until a subsequent streaming session is initiated. Responsive to initiation of the subsequent streaming session, the metadata may be erased to enable storage of additional metadata or the additional metadata can be appended to the previously-stored metadata.

At 610, a request for metadata is received from another of the multiple peer devices. This request may be received via another wireless connection of a wireless link or an IP-based network connection. For example, the request may be received via a serial port profile connection with the other peer device. This request can be received while the receiver device continues to receive the content from the peer device via the previously-mentioned wireless link. In some cases, the request also requests information associated with presentation of the content or information associated with a peer device from which the content is streamed.

At 612, the metadata is transmitted to the other peer device from which the request is received. This metadata can include metadata associated with one stream of content that is presented or all streams of content presented. Additionally, information describing presentation of the content or information associated with peer devices from which the content is streamed. Transmitting the metadata and other information to the other peer device enables the metadata to be presented to a respective user of the other peer device. This can be effective to enable the user of the other peer device to review information associated with the content being presented or procure the content for personal use, such as when not in the presence of the peer device or receiver device.

Figure 7:
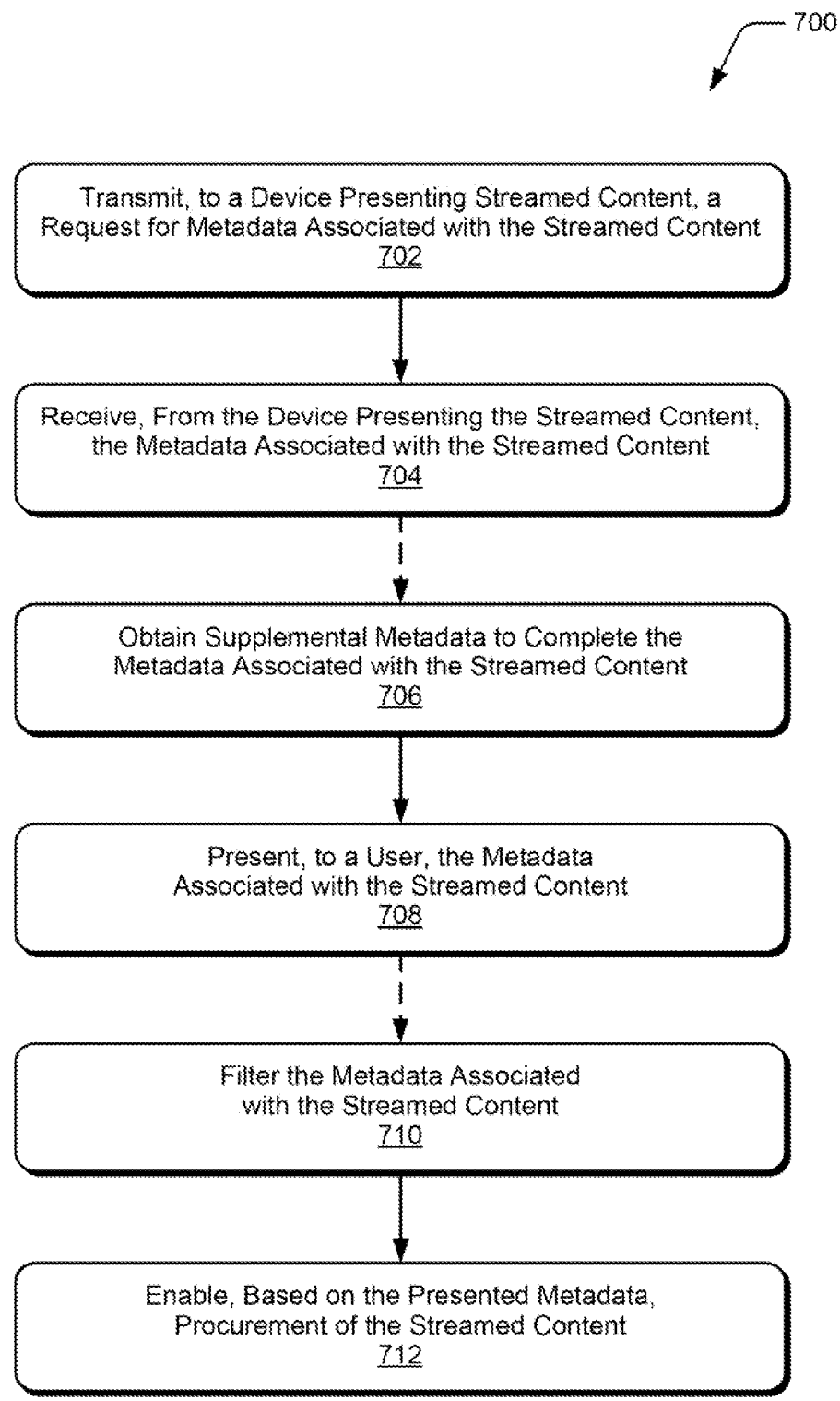
FIG. 7 illustrates an example method for presenting metadata performed at least in part by a peer device.

FIG. 7 illustrates an example method for presenting metadata performed at least in part by a peer device.

At 702, a request for metadata is transmitted to a device presenting streamed content. The request is transmitted from a peer device that is associated with the device presenting the streamed content. The request can be a request for metadata associated with the streamed content being presented or previously-presented streamed content. In some cases, the request is transmitted via a connection of a wireless network or an IP-based communication network, such as a WLAN or Ethernet connection. In such cases, the device presenting the content may be receiving the streamed content from another peer device via another connection of a wireless network, such as an A2DP connection.

At 704, the metadata associated with the streamed content is received from the device presenting the streamed content. The metadata may be associated with content from one or more content streaming sessions. The metadata may be received in any suitable format, such as an array, list, table, comma-separated-variables, and the like. In some cases, the metadata includes images or other multimedia items that describe the content. Additionally, information associated with presentation of the content or information identifying a source device for the content may also be received. The metadata may be received via a connection of the wireless network of an IP-based communication network. For example, the metadata can be received via a serial port profile connection of a Bluetooth™ pico-net or a peer-to-peer connection of a WLAN (e.g., Wifi-Direct).

Optionally at 706, supplemental metadata is obtained to complete the metadata associated with the streamed content. In cases in which partial metadata is received for a portion or file of content, supplemental information can be obtained from another source, such as the Internet or online content services. This supplemental information may include an artist, album, track, genre, or images associated with the portion or file of streamed content. The supplemental information may also be used to correct, or verify, any existing metadata determined to be inconsistent with the supplemental information.

At 708, the metadata associated with the streamed content is presented to a user. The metadata is presented via a display associated with the peer device, such as a touch-enabled display. The metadata may also be presented with the information associated with presentation of the content and the information identifying peer devices from which the content is received. By way of example, the metadata may be presented in a table or list format, similar to that of data structure 500. The user of the peer device can review, edit, or otherwise manipulate the metadata presented.

Optionally at 710, the metadata associated with the streamed content is filtered. The metadata may be filtered based on any suitable parameter or preference, such as by a source of the content (e.g., a particular user), order of presentation, time of presentation, genre, and the like. By way of example, the metadata can be filtered based on any field of data structure 500 or another user defined criteria. In some cases, duplicate entries of metadata are removed to decrease an amount of memory occupied by the metadata.

Alternately or additionally, the metadata associated with the content can be re-ordered or organized by the user. Filtering or re-ordering the metadata can be effective to allow the user to create a custom playlist of preferred content from one or more content streaming sessions. This custom playlist, or an unmodified playlist, can be accessed by applications on the user's device, which can obtain music based on the playlist. For example, a user can request, from a receiver device, metadata associated with a particular content streaming session. A local music streaming application executing on the user's device leveraging the metadata can pull songs, in order, from an online content source effective to recreate the particular content streaming session on the user's device.

At 712, procurement of the streamed content is enabled based on the presented metadata. Procurement may include purchase, download, or streaming of the content at the peer device. In some cases, an online source of the content may be identified from which the content can be procured. In such cases, the user may be presented with options to purchase portions or files of content presented by the device from which the metadata is received. Alternately or additionally, an option may be presented to indicate a preference to particular portions or files of the content, such as one or more songs, artists, genres, and the like. These preferences can then be indicated to a cloud-based music service, such that the cloud-based music service streams content to the user based on the indicated preferences.

Example Receiver Device

Figure 8:
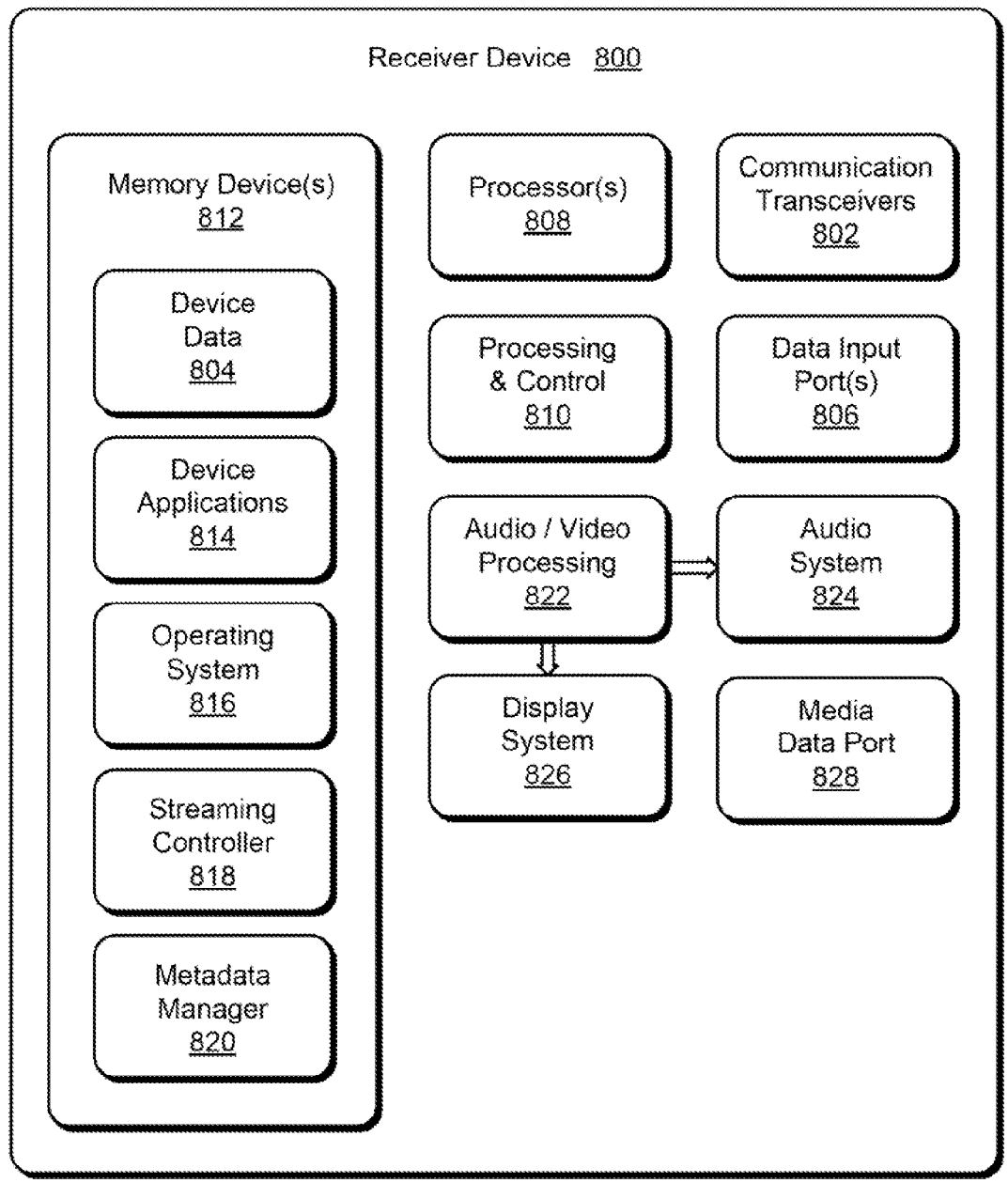
FIG. 8 illustrates various components of a content-receiver device that can implement techniques of distributing metadata to peer devices.

FIG. 8 illustrates various components of an example content-receiver device 800 (receiver device 800), which is implemented in hardware, firmware, and/or software, or as described with reference to any of the previous FIGS. 1-7 to implement distribution of metadata to one or more peer devices.

Receiver device 800 includes communication transceivers 802 that enable wired or wireless communication of device data 804, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (Wi-MAX™) standards, and wired LAN Ethernet transceivers.

Receiver device 800 may also include one or more data-input ports 806 via which any type of data, media content, and inputs can be received, such as user-selectable inputs, messages, music, television content, recorded video content, and any other type of audio, video, or image data received from any content or data source. Data-input ports 806 may include USB ports, coaxial cable ports, and other serial or parallel connectors (including internal connectors) for flash memory, DVDs, CDs, and the like. These data-input ports may be used to couple the receiver device to components, peripherals, or accessories such as keyboards, microphones, or cameras.

Receiver device 800 of this example includes processor system 808 (e.g., any of application processors, microprocessors, digital-signal processors, controllers, and the like), or a processor and memory system (e.g., implemented in a system-on-chip), which process computer-executable instructions to control operation of the device. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and other hardware. Alternatively or in addition, the receiver device can be implemented with any one or combination of software, hardware, firmware, or fixed-logic circuitry that is implemented in connection with processing and control circuits, which are generally identified at 810 (processing and control 810). Although not shown, receiver device 800 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, or local bus that utilizes any of a variety of bus architectures.

Receiver device 800 also includes one or more memory devices 812 that enable data storage, examples of which include random access memory (RAM), non-volatile memory (e.g., read-only memory (ROM), flash memory, EPROM, EEPROM, etc.), and a disk storage device. Memory devices 812 are implemented at least in part as physical devices that store information (e.g., digital or analog values) in storage media, which do not include propagating signals or waveforms. The storage media may be implemented as any suitable type of media such as electronic, magnetic, optic, mechanical, quantum, atomic, and so on. Memory devices 812 provide data storage mechanisms to store the device data 804 (e.g., peer information 126 and content metadata 128), other types of information or data, and various device applications 814 (e.g., software applications). For example, operating system 816 can be maintained as software instructions within memory devices 812 and executed by processors 808. In some aspects, streaming controller 818 and metadata manager 820 are embodied in memory devices 812 of receiver device 800 as executable instructions or code. Although represented as a software implementation, streaming controller 818 and metadata manager 820 may be implemented as any form of a control application, software application, signal processing and control module, firmware that is installed on the device, a hardware implementation of the controller, and so on.

Receiver device 800 also includes audio and video processing system 822 that processes audio data and passes through the audio and video data to audio system 824 and to display system 826. Audio system 824 and display system 826 may include any modules that process, display, or otherwise render audio, video, display, or image data, such as streaming controller 818 and metadata manager 820. Display data and audio signals can be communicated to an audio component and to a display component via an RF (radio frequency) link, S-video link, HDMI, composite video link, component video link, DVI (digital video interface), analog audio connection, or other similar communication link, such as media data port 828. In some implementations, audio system 824 and display system 826 are external components to receiver device 800. Alternatively or additionally, display system 826 can be an integrated component of the example receiver device, such as part of an integrated display and touch interface. As described above, streaming controller 818 may manage or control presentation of content via audio system 824 or display system 826 in aspects of distributing of metadata to peer devices.

Although embodiments of distributing metadata to peer devices are described in language specific to features or methods, the subject of the appended claims is not necessarily limited to the specific features or methods described. Rather, the specific features and methods are disclosed as example implementations of distributing metadata to peer devices.

What is claimed is:

1. A method comprising:
   presenting, by a receiver device, content streamed from a first peer device, the content received via a wireless network;
   receiving, by the receiver device, from the first peer device, and via the wireless network, metadata associated with the content streamed from the first peer device;
   storing, in a local repository of the receiver device, the metadata associated with the content streamed from the first peer device, wherein other metadata associated with other content previously presented by the receiver device is also stored in the local repository;
   generating, by the receiver device and based on the metadata stored in the local repository, a playlist of content presented by the receiver device; and
   transmitting, from the receiver device and to a second peer device, at least the playlist and a portion of the metadata stored in the repository, wherein the second peer device is distinct from the first peer device.

2. The method of claim 1 further comprising:
   receiving, by the receiver device and from the second peer device, a request for information about the content presented by the receiver device,
   wherein transmitting at least the playlist and the portion of the metadata to the second peer device is in response to receiving the request.

3. The method of claim 1, wherein the content streamed from the first peer device includes multiple audio files, and wherein the metadata includes respective metadata associated with at least two of the multiple audio files.

4. The method of claim 1, further comprising:
   presenting, by the receiver device, content streamed from a third peer device, the content received via the wireless network;
   receiving, by the receiver device, from the third peer device, and via the wireless network, additional metadata associated with the content streamed from the third peer device;
   storing, by the receiver device and in the local repository, the additional metadata associated with the content streamed from the third peer device; and
   transmitting, by the receiver device and to the second peer device, at least some of the additional metadata stored in the repository.

5. The method of claim 4, wherein transmitting at least some of the metadata and the additional metadata is performed while presenting the content streamed from the third peer device.

6. The method of claim 1, wherein the wireless network is a wireless personal-area-network, the content streamed from the first peer device is streamed via an advanced audio distribution profile connection of the wireless personal-area-network, and the metadata received from the first peer device is received via an audio-video remote control profile connection of the wireless personal-area-network.

7. The method of claim 6, wherein the at least some of the metadata transmitted to the second peer device is transmitted via a serial port profile connection of the wireless personal-area-network.

8. The method of claim 1, wherein the at least some of the metadata transmitted to the second peer device is transmitted, via an internet protocol, through a wired network or another wireless network.

9. A method comprising:
establishing, by a receiver device and via a wireless transceiver of the receiver device, respective wireless links with each of a plurality of peer devices;
receiving, by the receiver device, from a first peer device from the plurality of peer devices, and via the respective wireless link with the first peer device, a stream of content and metadata associated with the stream of content;
presenting, by the receiver device, the stream of content;
storing, by the receiver device, the metadata and information associated with presenting the stream of content; and
transmitting, by the receiver device, to a second peer device from the plurality of peer devices, and via the respective wireless link to the second peer device, the metadata and the information, wherein the first peer device is distinct from the second peer device.

10. The method of claim 9 further comprising receiving, by the receiver device and from the second peer device, a request for the metadata and the information, and wherein transmitting the metadata and the information is in response to receiving the request for the metadata and the information.

11. The method of claim 9, wherein the wireless network is a wireless personal-area-network, the stream of content is received via an advanced audio distribution profile connection of the wireless personal-area-network, and the metadata received via an audio-video remote control profile connection of the wireless personal-area-network.

12. The method of claim 11, wherein the metadata and the information are transmitted to the other peer device via a serial port profile of the wireless personal-area-network.

13. The method of claim 9, wherein the stream of content comprises a stream of audio files or video files, and presenting the stream of content comprises playing the audio files through one or more speakers or displaying the video files via a monitor.

14. The method of claim 9, wherein the stream of content includes multiple files of content and the information associated with presenting the stream of content includes information associated with presenting one of the multiple files of content.

15. The method of claim 14, wherein the information associated with presenting one of the multiple files of content comprises an indication of:
a time at which presentation was initiated;
a duration of presentation;
an identity of the peer device from which the file of content is streamed;
an identity of a user associated with the peer device from which the file of content is streamed; or
whether presentation of the file of content is preempted by presentation of a different file of content.

16. An apparatus, comprising:
transceiver circuitry configured to communicate with a plurality of peer devices via a wireless network;
audio circuitry configured to present one or more streams of content received from one or more of the plurality of peer devices via the wireless network;
a processor; and
memory media storing processor-executable instructions that, when executed by the processor, implement a metadata manager to:
receive, from a first peer device from the plurality of peer devices and via the wireless network, metadata associated with a stream of content received from the first peer device and presented via the audio circuitry, wherein other metadata associated with other content previously presented by the receiver device is also stored in the local repository;
store, in a local repository, the metadata associated with the stream of content received from the first peer device and presented via the audio circuitry;
generate, by the receiver device and based on the metadata stored in the local repository, a playlist of content presented by the receiver device; and
transmit, to a second peer device from the plurality of peer devices, at least the playlist and a portion of the metadata stored in the repository, wherein the second peer device is distinct from the first peer device.

17. The apparatus of claim 16, wherein the transceiver circuitry is configured to communicate via a wireless personal-area-network, the stream of content is received via an advanced audio distribution profile connection of the wireless personal-area-network, and the metadata is received via an audio-video remote control profile connection of the wireless personal-area-network.

18. The apparatus of claim 17, wherein the playlist and the portion of the metadata is transmitted via a serial port profile connection of the wireless personal-area-network or another internet-protocol based network connection.

19. The apparatus of claim 16, wherein the transceiver circuitry is configured to communicate with each of the plurality of peer devices over a respective wireless link.

20. The apparatus of claim 16, wherein the apparatus is embodied in whole or part as a wireless transceiver module, audio system receiver, portable audio system, vehicle-based audio system, speaker-equipped media player, or auxiliary audio input device.

* * * * *